(12) United States Patent
Yamaguchi et al.

(10) Patent No.: US 12,467,106 B2
(45) Date of Patent: Nov. 11, 2025

(54) METHOD OF PRODUCING GRAIN-ORIENTED ELECTRICAL STEEL SHEET AND ANNEALING SEPARATOR APPLICATION LINE

(71) Applicant: JFE STEEL CORPORATION, Tokyo (JP)

(72) Inventors: Hiroi Yamaguchi, Tokyo (JP); Takashi Terashima, Tokyo (JP); Makoto Watanabe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 845 days.

(21) Appl. No.: 17/593,560

(22) PCT Filed: Mar. 26, 2020

(86) PCT No.: PCT/JP2020/013750
§ 371 (c)(1),
(2) Date: Sep. 21, 2021

(87) PCT Pub. No.: WO2020/196773
PCT Pub. Date: Oct. 1, 2020

(65) Prior Publication Data
US 2022/0195553 A1 Jun. 23, 2022

(30) Foreign Application Priority Data
Mar. 26, 2019 (JP) .................. 2019-059316

(51) Int. Cl.
*C21D 9/46* (2006.01)
*C21D 6/00* (2006.01)
(Continued)

(52) U.S. Cl.
CPC .............. *C21D 9/46* (2013.01); *C21D 6/005* (2013.01); *C21D 6/008* (2013.01); *C21D 8/005* (2013.01);
(Continued)

(58) Field of Classification Search
CPC ........ C21D 9/46; C21D 8/005; C21D 8/1222; C21D 8/1233; C21D 8/1283; C21D 8/1272; H01F 1/147; B21C 47/02
See application file for complete search history.

(56) References Cited

U.S. PATENT DOCUMENTS 4,655,854 A   4/1987  Nishiike et al.

FOREIGN PATENT DOCUMENTS

| JP | S6267118 A | 3/1987 |
| JP | H0531425 A * | 2/1993 |

(Continued)

OTHER PUBLICATIONS

Aug. 19, 2022, Office Action issued by the China National Intellectual Property Administration in the corresponding Chinese Patent Application No. 202080024161.8 with English language search report.

(Continued)

*Primary Examiner* — Anthony M Liang
(74) *Attorney, Agent, or Firm* — KENJA IP LAW PC (57) ABSTRACT

Provided is a method of producing a grain-oriented electrical steel sheet having uniform and good coating properties and magnetic properties throughout the length and/or width of the steel sheet. The method comprises: subjecting a steel slab to hot rolling, to cold rolling once or twice or more with intermediate annealing therebetween, and to primary recrystallization annealing; applying a liquid or slurry annealing separator to a resultant steel sheet; and thereafter coiling the steel sheet and subjecting the steel sheet to final annealing, (Continued)

wherein, before, after, or simultaneously with the application of the annealing separator, an additive for changing a composition of the annealing separator is adhered to the steel sheet at a weight ratio of 15% or less to a total of the annealing separator and the additive so as to vary the composition of the annealing separator in a longitudinal direction and/or width direction of the steel sheet.

1 Claim, 4 Drawing Sheets (51) Int. Cl.
- C21D 8/00 (2006.01)
- C21D 8/12 (2006.01)
- C22C 38/00 (2006.01)
- C22C 38/02 (2006.01)
- C22C 38/04 (2006.01)
- C22C 38/06 (2006.01)
- C22C 38/12 (2006.01)
- H01F 1/147 (2006.01)
- H01F 41/02 (2006.01)

(52) U.S. Cl.
CPC ......... C21D 8/1222 (2013.01); C21D 8/1233 (2013.01); C21D 8/1283 (2013.01); C22C 38/001 (2013.01); C22C 38/002 (2013.01); C22C 38/02 (2013.01); C22C 38/04 (2013.01); C22C 38/06 (2013.01); C22C 38/12 (2013.01); H01F 1/147 (2013.01); H01F 41/02 (2013.01); *C22C 2202/02* (2013.01)

(56) References Cited

FOREIGN PATENT DOCUMENTS

| | | | |
|---|---|---|---|
| JP | H05104036 A | | 4/1993 |
| JP | H0668133 B2 | * | 8/1994 |
| JP | H08283866 A | | 10/1996 |
| JP | 09241754 A | * | 9/1997 |
| JP | H09241754 A | | 9/1997 |
| JP | H11350152 A | | 12/1999 |
| JP | 4501655 B2 | * | 7/2010 |
| JP | 2014114490 A | | 6/2014 |
| JP | 2015086437 A | * | 5/2015 ............... C21D 8/12 |
| KR | 100762436 B1 | * | 10/2007 |

OTHER PUBLICATIONS

Feb. 15, 2023, Office Action issued by the Korean Intellectual Property Office in the corresponding Korean Patent Application No. 10-2021-7033024 with English language concise statement of relevance.

Mar. 14, 2023, Office Action issued by the China National Intellectual Property Administration in the corresponding Chinese Patent Application No. 202080024161.8 with English language search report.

Lu Fengxi et al., Foreign cold-rolled silicon steel production technology, Mar. 31, 2013 with a partial English translation.

Aug. 3, 2021, Notification of Reasons for Refusal issued by the Japan Patent Office in the corresponding Japanese Patent Application No. 2020-542024 with English language Concise Statement of Relevance.

Jun. 16, 2020, International Search Report issued in the International Patent Application No. PCT/JP2020/013750.

Sep. 28, 2023, Office Action issued by the China National Intellectual Property Administration in the corresponding Chinese Patent Application No. 202080024161.8 with English language concise statement of relevance.

* cited by examiner

METHOD OF PRODUCING GRAIN-ORIENTED ELECTRICAL STEEL SHEET AND ANNEALING SEPARATOR APPLICATION LINE

TECHNICAL FIELD

The present disclosure relates to a method of producing a grain-oriented electrical steel sheet and an annealing separator application line capable of making the coating properties and magnetic properties of a grain-oriented electrical steel sheet, which is used in iron cores of transformers and the like, uniform and good throughout the length and/or the width of the steel sheet.

BACKGROUND

A grain-oriented electrical steel sheet is, as soft magnetic material, mainly used for iron core material of transformers, rotators, and the like, and is required to have high magnetic flux density and low iron loss and magnetostriction as magnetic properties. To meet this requirement, it is necessary to form, by secondary recrystallization, texture called Goss-orientation in which <001> axis as the easy magnetization axis is highly aligned with the rolling direction. Such a grain-oriented electrical steel sheet is produced by: heating a grain-oriented silicon steel slab containing an inhibitor necessary for secondary recrystallization, such as MnS, MnSe, or AlN, and subjecting the steel slab to hot rolling; thereafter optionally annealing the resultant steel sheet; subjecting the steel sheet to cold rolling once, or twice or more with intermediate annealing therebetween, into a finished product sheet thickness; thereafter subjecting the steel sheet to decarburization annealing; and thereafter applying an annealing separator such as MgO to the steel sheet and then subjecting the steel sheet to final annealing. A forsterite ($Mg_2SiO_4$) insulating coating (or film) (hereafter referred to as "forsterite film") is formed on the surface of this grain-oriented electrical steel sheet, except in special cases. The film not only electrically insulates the surface, but also imparts tensile stress to the steel sheet by its low thermal expansibility, thus effectively improving iron loss and magnetostriction.

The forsterite film is formed in the final annealing. Here, the film formation behavior influences the behavior of the inhibitor such as MnS, MnSe, or AlN in the steel, and consequently influences the secondary recrystallization which is an essential process for obtaining excellent magnetic properties. In detail, forsterite formation reaction begins from the heating process in the final annealing. In the case where the forsterite film formed during the final annealing is porous or in the case where the film formation progresses nonuniformly, O and/or N in the annealing atmosphere tends to enter into the steel, causing the inhibitor in the steel to decompose, coarsen, or become excessive. This results in secondary recrystallized texture that has a low degree of accumulation into the Goss orientation and has degraded magnetic properties. Moreover, as a result of the formation of the forsterite film, the inhibitor component that is no longer necessary concentrates in the vicinity of the film and substantially purifies the steel. This contributes to improved magnetic properties of the steel sheet. Hence, controlling the film formation process to form a uniform forsterite film is an important point for the product quality of the grain-oriented electrical steel sheet.

Furthermore, the formed forsterite film needs to be uniform and free from defects, and have excellent adhesion to withstand shearing, blanking, bending, and the like. The forsterite film also needs to reduce degradation in the magnetic properties by stress relief annealing performed by a user, and have a smooth surface and exhibit a high stacking factor when the steel sheets are stacked as an iron core.

The forsterite film is thus required to have numerous properties. Therefore, for the annealing separator which is reaction material for the forsterite film, starting from MgO which is, as the single component, intended to prevent sticking in high-temperature coil annealing, there have been made many years of efforts such as improvement on the quality of the MgO material, the hydration condition during slurry formation, or addition of various agents to impart multiple properties, in order to enhance the reactivity with subscale mainly containing $SiO_2$ formed on the steel sheet surface or to stabilize the oxidation and decomposition reaction of the inhibitor responsible for the secondary recrystallization.

Regarding methods of applying slurry annealing separators, JP S62-67118 A (PTL 1) discloses a roll coater-based application method, and JP H11-350152 A (PTL 2) discloses an adhesion method using a spray nozzle. Attempts have been made to, by applying an annealing separator uniformly to the front and back sides of a steel sheet, achieve uniform forsterite film formation and secondary recrystallization throughout the length and/or the width of the coil in final annealing.

CITATION LIST

Patent Literature

PTL 1: JP S62-67118 A
PTL 2: JP H11-350152 A

SUMMARY

Technical Problem

However, when the steel strip after the final annealing is developed in the longitudinal direction, the parts of the steel sheet edge corresponding to the upper surface during the final annealing or outermost periphery of the coil are often found to have coating degradation such as degradation of bending adhesion or secondary recrystallization failure which are caused by exposure to higher temperature. This is a phenomenon that inevitably occurs as the coil is typically placed with its winding end surface facing upward and heated and annealed from the outer side of the coil. Meanwhile, in the longitudinal middle winding portion or transverse middle (i.e. center/middle in the width direction) portion of the coil, failures in forsterite film formation or secondary recrystallization tend to occur, for example, because the annealing time or the heating rate is insufficient, or because the contact pressure between overlapping steel sheets increases due to the difference in thermal expansion resulting from nonuniform heating of the coil and thus the flowability of atmosphere gas between layers worsens.

That is, even when the annealing separator can be applied uniformly, the annealing condition differs depending on the part of the coil as long as batch-type final annealing is performed in coil form, and accordingly it is very difficult to perform uniform forsterite film formation and secondary recrystallization throughout the length and/or the width. Adding an additive effective in increasing the reactivity of the coil middle winding portion in which heating tends to be delayed and the flowability of atmosphere gas is poor causes excessive reaction in the coil outer winding portion, and vice versa.

To solve the problems stated above and produce a grain-oriented electrical steel sheet having uniform properties throughout the length and/or the width of the coil, the following application method and application line have been conceived based on the idea opposite to conventional ones, in view of nonuniformity in forsterite film formation and secondary recrystallization in coil annealing: The application method and the application line do not apply an annealing separator uniformly but change the composition of the annealing separator in the longitudinal (i.e. rolling) direction and/or the width (i.e. transverse) direction of a steel sheet so that the annealing separator having an optimal composition can be adhered depending on the site of the coil. PTL 2 proposes a technique of arranging a plurality of spray nozzles and discharging an annealing separator having a different composition from each spray nozzle to address deviation in the coating quality of the coil. However, arranging a plurality of spray nozzles to apply a liquid or slurry annealing separator is likely to cause a problem in that the applied coating thickness varies in the width direction of the steel sheet and a wrinkle-like shape defect occurs in the longitudinal direction of the steel sheet during flattening annealing after final annealing. Further, when slurry mainly containing MgO is sprayed for a long time, sludge accumulates inside the supply pipes, which causes problems such as hindering uniform slurry supply and clogging the spray nozzles. This makes stable operation impossible.

JP 4501655 B2 discloses a technique whereby the composition of an annealing separator applied is changed between a region from a coil innermost winding portion to a position of 90% in coil outer diameter and a region from the position of 90% in coil outer diameter to an outermost winding portion. This technique is effective in resolving deviations in the magnetic properties in the longitudinal direction of the steel sheet, but cannot resolve deviations in the magnetic properties or the coating properties in the width direction of the steel sheet.

It could therefore be helpful to provide a method of producing a grain-oriented electrical steel sheet and an annealing separator application line capable of obtaining a grain-oriented electrical steel sheet having uniform and good coating properties and magnetic properties throughout the length and/or the width of the steel sheet.

Solution to Problem

We thus provide:

(1) A method of producing a grain-oriented electrical steel sheet, the method comprising: subjecting a steel slab having a predetermined chemical composition to hot rolling, to obtain a hot-rolled steel sheet; subjecting the hot-rolled steel sheet to cold rolling once or twice or more with intermediate annealing therebetween, to obtain a cold-rolled steel sheet; subjecting the cold-rolled steel sheet to primary recrystallization annealing; applying a liquid or slurry annealing separator to the cold-rolled steel sheet after the primary recrystallization annealing; and thereafter coiling the steel sheet and subjecting the steel sheet to final annealing, wherein, before, after, or simultaneously with the application of the annealing separator, an additive for changing a composition of the annealing separator is adhered to the cold-rolled steel sheet subjected to the primary recrystallization annealing at a weight ratio of 15% or less to a total of the annealing separator and the additive so as to vary the composition of the annealing separator in at least one selected from a longitudinal direction and a width direction of the cold-rolled steel sheet.

(2) An annealing separator application line comprising: a main line configured to apply a liquid or slurry annealing separator to a steel sheet; and an auxiliary line configured to adhere an additive for changing a composition of the annealing separator to the steel sheet at a weight ratio of 15% or less to a total of the annealing separator and the additive so as to vary the composition of the annealing separator in at least one selected from a longitudinal direction and a width direction of the steel sheet.

Advantageous Effect

It is thus possible to obtain a grain-oriented electrical steel sheet having uniform and good coating properties and magnetic properties throughout the length and/or the width of the steel sheet.

DETAILED DESCRIPTION

Experimental results that led to the discovery of the presently disclosed technique will be described below. Regarding the composition of a steel sheet and the composition of an annealing separator, "%" and "ppm" respectively denote mass % and mass ppm unless otherwise noted.

Experiment

Steel slabs having a chemical composition containing C: 300 ppm, Si: 3.40%, Mn: 0.25%, Al: 50 ppm, S: 5 ppm, Se: 5 ppm, N: 30 ppm, Cu: 0.04%, and P: 0.04% with the balance consisting of Fe and inevitable impurities were each continuously cast, then heated to 1150° C., and then subjected to hot rolling to obtain a hot-rolled sheet of 2.2 mm in thickness. Following this, the hot-rolled sheet was subjected to hot-rolled sheet annealing at 1000° C., and then subjected to cold rolling twice with intermediate annealing therebetween to obtain a final cold-rolled sheet having a final sheet thickness of 0.23 mm. After this, the cold-rolled sheet was subjected to decarburization annealing for 1 min in a wet hydrogen atmosphere of 840° C.

parts by weight of magnesium sulfate" denote total parts by weight of magnesium sulfate derived from the applied magnesia slurry and the sprayed magnesium sulfate aqueous solution.

TABLE 1

| Sample ID | | Ratio of magnesium sulfate aqueous solution (%) | Total parts by weight of magnesium sulfate | Coating appearance | Magnetic flux density $B_8$ (T) | Remarks |
|---|---|---|---|---|---|---|
| A | | — | 3.0 | Uniform and good | 1.93 | Standard (comparison) |
| B | B1 | 30 | 2.0 | Uneven and not bright | 1.88 | Comparative Example |
| | B2 | 20 | 3.0 | Nonuniform and not bright | 1.89 | Comparative Example |
| | B3 | 10 | 1.5 | Uniform but slightly thin-film | 1.91 | Comparative Example |
| | B4 | 10 | 3.0 | Uniform and good, as with A | 1.93 | Example |
| C | C1 | 25 | 4.5 | Thick-film and nonuniform | 1.90 | Comparative Example |
| | C2 | 20 | 3.0 | Slightly thick-film and nonuniform | 1.91 | Comparative Example |
| | C3 | 15 | 3.0 | Uniform and good, as with A | 1.93 | Example |
| | C4 | 10 | 1.5 | Uniform but slightly thin-film | 1.91 | Comparative Example |
| D | D1 | 20 | 3.0 | Nonuniform and not bright | 1.91 | Comparative Example |
| | D2 | 16 | 3.0 | Slightly nonuniform | 1.92 | Comparative Example |
| | D3 | 12 | 3.0 | Uniform and good, as with A | 1.93 | Example |
| | D4 | 8 | 4.0 | Uniform but slightly thin-film | 1.91 | Comparative Example |

Next, to closely study whether application of an annealing separator can be divided between application of magnesia slurry as a principal component using a roll coater and spray application of an additive for changing the composition of the magnesia slurry and their appropriate ranges, a sample for laboratory experiment with a length of 300 mm and a width of 100 mm was cut out of a coil of the obtained decarburization annealed sheet. The sample was subjected to degreasing treatment, and then 10 mass % magnesia slurry (A) obtained by adding 7 parts by weight of $TiO_2$ and 3 parts by weight of magnesium sulfate with respect to 100 parts by weight of MgO, which is considered to be an optimal composition of the annealing separator, was applied uniformly to the sample using a roll coater, and dried and baked to prepare a standard material. Meanwhile, 10 mass % magnesia slurry (B) obtained by adding only 7 parts by weight of $TiO_2$ with respect to 100 parts by weight of MgO, 10 mass % magnesia slurry (C) obtained by adding 7 parts by weight of $TiO_2$ and 1 part by weight of magnesium sulfate with respect to 100 parts by weight of MgO, 10 mass % magnesia slurry (D) obtained by adding 7 parts by weight of $TiO_2$ and 2 parts by weight of magnesium sulfate with respect to 100 parts by weight of MgO, and magnesium sulfate aqueous solutions of various concentrations were prepared. The magnesia slurries (B), (C), and (D) were uniformly applied to the decarburization annealed sheets using a roll coater, and then the magnesium sulfate aqueous solutions each having a ratio and a concentration adjusted so as to achieve the total parts by weight of magnesium sulfate after mixing shown in Table 1 were uniformly sprayed over the decarburization annealed sheets. The decarburization annealed sheets were subsequently dried and baked.

After this, all samples were subjected to final annealing of heating to 1200° C. at a heating rate of 25° C./h to cause secondary recrystallization, and the coating appearance and the magnetic flux density $B_8$ were evaluated. The evaluation results are shown in Table 1. In Table 1, "ratio of magnesium sulfate aqueous solution (%)" denotes the weight ratio of the sprayed magnesium sulfate aqueous solution to the total of the magnesia slurry applied using the roll coater and the sprayed magnesium sulfate aqueous solution, and "total As shown in Table 1, for each of the magnesia slurries (B), (C), and (D), in the case where the ratio of the magnesium sulfate aqueous solution was 15% or less, a uniform coating and good magnetic properties were obtained as with the magnesia slurry (A). In the case where the ratio of the magnesium sulfate aqueous solution was more than 15%, on the other hand, the coating appearance was nonuniform or poor, and the magnetic flux density $B_8$ was poor as compared with the magnesia slurry (A). This is presumed to be because, in the case where the ratio of the magnesium sulfate aqueous solution was more than 15%, the magnesia slurry applied using the roll coater and the sprayed magnesium sulfate aqueous solution were not mixed sufficiently, and thus the application conditions were not the same as the magnesia slurry (A) containing 3 parts by weight of magnesium sulfate from the beginning. In the case where the ratio of the magnesium sulfate aqueous solution was 15% or less and magnesium sulfate was 3.0 parts by weight or more and less than 4.0 parts by weight, good coating appearance and magnetic properties were achieved as with the magnesia slurry (A), and also the coating was not thin-film.

(Annealing Separator Application Line)

An embodiment of an annealing separator application line that can be used in a method of producing a grain-oriented electrical steel sheet according to the present disclosure will be described below.

The annealing separator application line according to this embodiment includes: a main line configured to apply a liquid or slurry annealing separator to a steel sheet; and an auxiliary line configured to adhere an additive for changing the composition of the annealing separator to the steel sheet while varying its weight ratio to the annealing separator in a range of 15% or less in the longitudinal direction and/or the width direction of the steel sheet. The main line and the auxiliary line will be described in detail below.

[Main Line]

As the main line, a known spray-type or roll coater-type application device may be used. In the case of using magnesia slurry mainly containing MgO as the annealing separator, it is preferable to use a roll coater-type application device rather than a spray-type application device whose supply pipe is susceptible to clogging as sludge and the like tend to accumulate in the supply pipe. In this case, the main line may include a slurry supply nozzle and a squeeze roll. The slurry supply nozzle has a plurality of discharge ports for applying magnesia slurry to the steel strip. The squeeze roll includes a pair of rolls that clamp the steel strip in the thickness direction and uniformly reduce the magnesia slurry applied to the steel strip to a predetermined thickness. The squeeze roll can be composed of a rough application roll and an application roll. Alternatively, only one of the rough application roll and the application roll may be installed or an additional slurry supply nozzle may be installed between the rough application roll and the application roll, depending on the required accuracy of the thickness of the magnesia slurry and the constraint on the installation space. The main line can be located downstream of a continuous annealing furnace used for decarburization annealing described later and upstream of a drying furnace for drying the annealing separator.

[Auxiliary Line]

As the auxiliary line, a spray device capable of adhering a liquid additive to the steel strip while adjusting the spraying amount is preferable, from the viewpoint of mixing the annealing separator and the additive. In this case, the spraying amount (weight to be adhered per unit area) of the spray device is preferably 15% or less with respect to the weight per unit area of the magnesia slurry applied by the main line. The slurry mainly containing MgO and applied by the main line has high specific gravity and high viscosity. Accordingly, when spraying a diluent using a spray or the like, if the spray amount is more than 15%, the additive cannot be uniformly mixed with the slurry before baking and drying. In principle, a smaller spraying amount is better. However, the additive may not be very soluble in water and cannot be easily formed into a high-concentration aqueous solution depending on the type. The spraying amount is more preferably 10% or less, although it depends on the liquid type. The auxiliary line can be divided as appropriate according to the required accuracy of the coating properties and magnetic properties of the steel strip in the width direction, and may be optionally arranged on the upper side and the lower side of the steel strip. Here, the auxiliary line need not be evenly divided in the width direction, and may be arranged only at the edges and the middle part. In the case where the number of types of auxiliary aqueous solutions is not one, two or more spray devices may be arranged at the upstream and downstream edges given that precipitation may occur or pH may become unstable. The auxiliary line may be located upstream or downstream of the main line. Alternatively, in the case where the squeeze roll composed of the rough application roll and the application roll is used as the main line, the auxiliary line may be appropriately located between the rough application roll and the application roll. Here, since the annealing separator applied by the main line and the additive adhered by the auxiliary line need to be mixed to a certain extent, the auxiliary line needs to be located upstream of the drying furnace. In the case where the squeeze roll is used as the main line, excess magnesia slurry is collected and circulated and supplied again from the slurry supply nozzle to the steel strip, and therefore the auxiliary line is preferably located downstream of the main line.

Figure 1A:
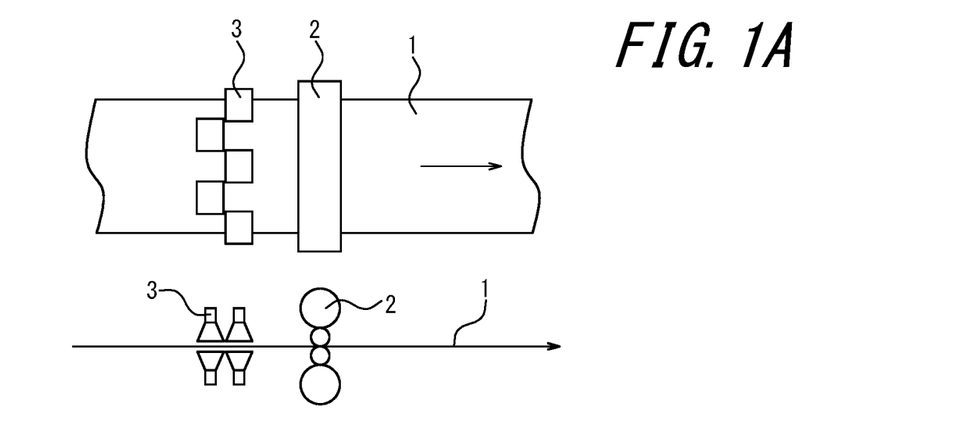
FIG. 1A is a schematic diagram illustrating an embodiment of an annealing separator application line according to the present disclosure.
Figure 1B:
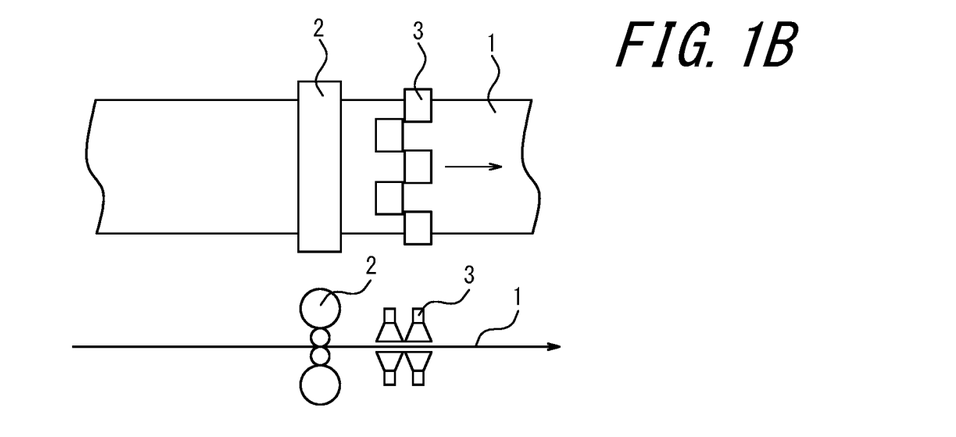
FIG. 1B is a schematic diagram illustrating another embodiment of an annealing separator application line according to the present disclosure.
Figure 1C:
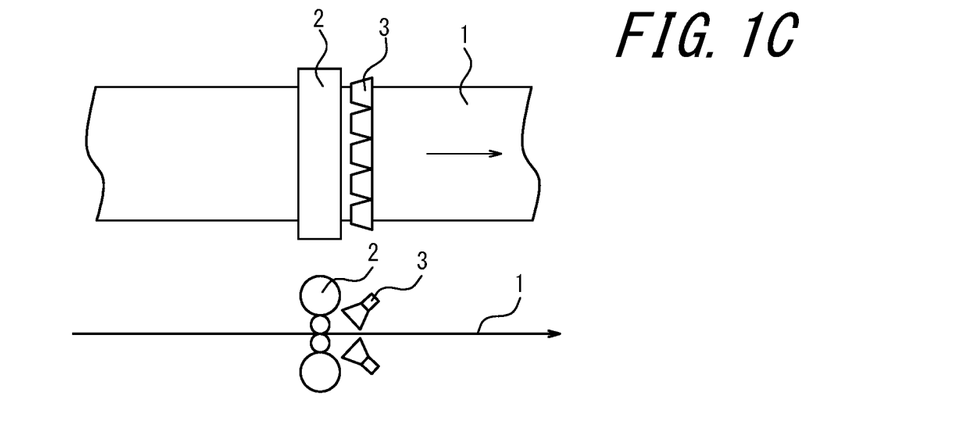
FIG. 1C is a schematic diagram illustrating another embodiment of an annealing separator application line according to the present disclosure.

Examples of arrangement of the main line (rough application roll and application roll) and the auxiliary line (spray device) will be described below, with reference to FIGS. 1A to 1C and FIGS. 2A to 2C. The arrows in the drawings designate the steel strip conveyance direction. FIG. 1A illustrates an example in which a spray device 3 and an application roll 2 are arranged in this order from the upstream side in the conveyance direction of a steel strip 1. FIGS. 1B and 1C each illustrate an example in which the application roll 2 and the spray device 3 are arranged in this order from the upstream side in the conveyance direction of the steel strip 1. In the examples in FIGS. 1A and 1B, the additive is directly adhered to the upper and lower sides of the steel strip 1. In the example in FIG. 1C, the spray device 3 is located near the application roll 2 and the additive sprayed from the spray device 3 is drawn into the annealing separator, to facilitate the mixing between the annealing separator and the additive. It is more preferable to locate the application roll 2 and the spray device 3 closer to each other. In FIGS. 1A to 1C, the slurry supply nozzle and the application roll are integrated into one unit.

Figure 2A:
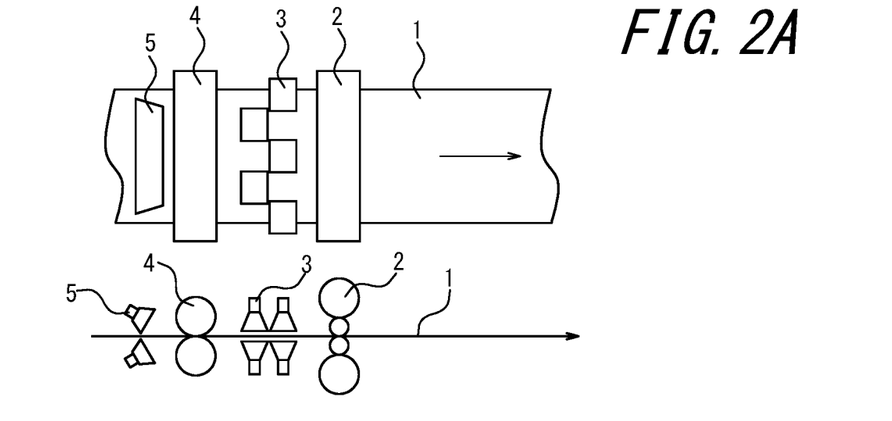
FIG. 2A is a schematic diagram illustrating another embodiment of an annealing separator application line according to the present disclosure.
Figure 2B:
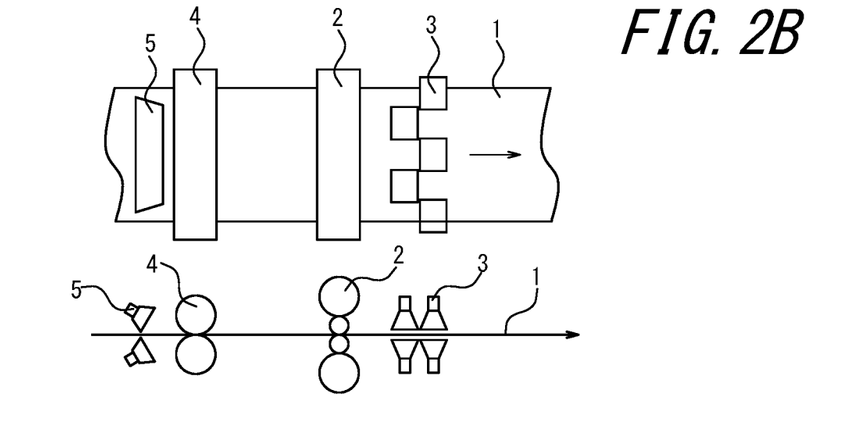
FIG. 2B is a schematic diagram illustrating another embodiment of an annealing separator application line according to the present disclosure.
Figure 2C:
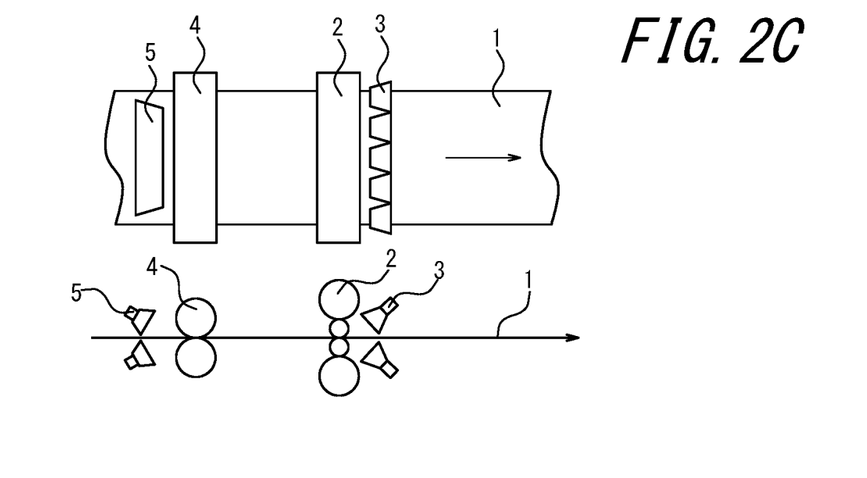
FIG. 2C is a schematic diagram illustrating another embodiment of an annealing separator application line according to the present disclosure.

FIGS. 2A to 2C each illustrate a system in which a rough application roll 4 and a slurry supply nozzle 5 are separated. In this way, the slurry can be applied to the steel strip 1 more uniformly and the thickness of the slurry can be controlled more accurately than the system using only the application roll 2 illustrated in FIGS. 1A to 1C. FIG. 2A illustrates an example in which the slurry supply nozzle 5, the rough application roll 4, the spray device 3, and the application roll 2 are arranged in this order from the upstream side in the conveyance direction of the steel strip 1. FIGS. 2B and 2C each illustrate an example in which the slurry supply nozzle 5, the rough application roll 4, the application roll 2, and the spray device 3 are arranged in this order. In the examples in FIGS. 2A and 2B, the additive is directly adhered to the upper and lower sides of the steel strip 1. In the example in FIG. 2C, the spray device 3 is located near the application roll 2 and the additive sprayed from the spray device 3 is drawn into the annealing separator, to facilitate the mixing between the annealing separator and the additive.

Applying the annealing separator by electrostatic coating is effective in preventing the steel sheet surface from oxidation in the final annealing. However, for example in the case of uniformly applying the slurry by the main line and then locally adhering the additive by the auxiliary line, there is a possibility that the slurry and the additive are not mixed sufficiently and the effect of the additive is insufficient or excessive, causing nonuniform coating properties or magnetic properties.

(Method of Producing Grain-Oriented Electrical Steel Sheet)

An embodiment of a method of producing a grain-oriented electrical steel sheet according to the present disclosure will be described below. In the present disclosure, the chemical composition of the grain-oriented electrical steel sheet is not limited, and a known chemical composition may be used suitably.

[Hot Rolling]

Molten steel adjusted to a preferred chemical composition is refined by a known method using a converter, an electric furnace, or the like and optionally subjected to vacuum treatment and the like, and then subjected to typical ingot casting or continuous casting to produce a slab. A thin slab or thinner cast steel of 100 mm or less in thickness may be directly produced by direct casting. The slab may be heated and hot rolled by a typical method. Alternatively, the slab may be directly hot rolled without heating, after the casting. In the case of the thin slab or thinner cast steel, the hot rolling may be performed, or the hot rolling may be omitted to directly perform the subsequent processes. The means of heating the slab may be a known means such as a gas furnace, an induction heating furnace, or a direct current furnace. The hot rolling following the heating of the slab is not limited, and may be performed under known conditions.

[Hot-Rolled Sheet Annealing]

The steel sheet is then optionally subjected to hot-rolled sheet annealing. The hot-rolled sheet annealing temperature is preferably 800° C. to 1200° C., to highly develop Goss texture in the product sheet. If the hot-rolled sheet annealing temperature is less than 800° C., band texture in the hot rolling remains, making it difficult to achieve primary recrystallized texture of uniformly-sized grains. Consequently, the development of secondary recrystallization is hindered. If the hot-rolled sheet annealing temperature is more than 1200° C., the inhibitor component which inevitably mixes in dissolves, and nonuniformly reprecipitates during cooling, making it difficult to achieve primary recrystallized texture of uniformly-sized grains. Consequently, the development of secondary recrystallization is hindered. Moreover, if the hot-rolled sheet annealing temperature is more than 1200° C., the grain size after the hot-rolled sheet annealing coarsens excessively, which is disadvantageous in achieving primary recrystallized texture of uniformly-sized grains.

[Cold Rolling]

The steel sheet is then subjected to cold rolling once, or twice or more with intermediate annealing therebetween. Although the intermediate annealing may be performed under known conditions, preferably the soaking temperature is 800° C. to 1200° C. and the soaking time is 2 sec to 300 sec. If the soaking temperature is less than 800° C. and/or the soaking time is less than 2 sec, non-recrystallized texture remains, making it difficult to achieve primary recrystallized texture of uniformly-sized grains. As a result, desired secondary recrystallized grains may not be obtained, causing degradation in the magnetic properties. If the soaking temperature is more than 1200° C. and/or the soaking time is more than 300 sec, Ostwald ripening of AlN, MnS, and MnSe progresses, and the inhibiting capability of the inhibitor necessary for secondary recrystallization is insufficient. As a result, secondary recrystallization may not occur, causing degradation in the magnetic properties.

In the cold rolling, it is effective to increase the rolling temperature to 100° C. to 250° C. and perform rolling, or perform aging treatment in a range of 100° C. to 250° C. once or more during the cold rolling, from the viewpoint of developing Goss texture.

[Decarburization Annealing]

After the final cold rolling, the steel sheet is subjected to decarburization annealing serving also as primary recrystallization annealing, to reduce C to 50 ppm or less, i.e. the range in which magnetic aging will not occur, and preferably to 30 ppm or less. The decarburization annealing is preferably performed at a temperature of 700° C. to 1000° C. in a wet atmosphere controlled to $PH_2O/PH_2>0.1$. The decarburization temperature is more preferably in a range of 800° C. to 900° C. After the decarburization annealing, a technique of increasing the Si content by siliconizing may be used. Nitriding, i.e. a technique of performing nitriding treatment before, after, or simultaneously with the decarburization annealing to form nitride such as MN and use it as an inhibitor, is included, too. In this case, the inhibitor component need not be fully dissolved in gas furnace heating for hot rolling, so that the slab heating temperature can be lowered.

[Application of Annealing Separator]

Next, an annealing separator is applied to the steel sheet. In the present disclosure, it is important to, before, after, or simultaneously with uniformly applying the annealing separator to the steel sheet, adhere an additive for changing the composition of the annealing separator at a weight ratio of 15% or less to the total of the annealing separator and the additive so as to vary the composition of the annealing separator in the longitudinal direction and/or the width direction of the steel sheet. Here, the liquid or slurry annealing separator is adjusted in composition so as to be optimal for forsterite film formation and secondary recrystallization, and is, for example, an annealing separator mainly containing MgO (magnesia). In the case of intentionally suppressing forsterite film formation and producing a mirror-surface coil with no surface oxide, an annealing separator mainly containing CaO (calcia) or $Al_2O_3$ (alumina) may be used. The additive is used to correct the influences of deviations in annealing temperature, annealing atmosphere, and contact pressure between steel sheets, and the like when performing final annealing on the steel sheet coiled after this process. Examples of the additive include a magnesium sulfate aqueous solution and a sodium borate aqueous solution. In the case of producing a mirror-surface coil, magnesium chloride or the like is used for suppressing uniform film formation. The additive adhered to the steel sheet is close to a solid solution state macroscopically. This process will be described in detail below using an example in which magnesia slurry is used as an annealing separator, with reference to FIG. 2B.

With reference to FIG. 2B, first, the magnesia slurry is uniformly applied to the upper and lower sides of the steel strip 1 using the slurry supply nozzle 5. The magnesia slurry applied to the upper and lower sides of the steel strip 1 is then uniformly reduced to a predetermined thickness using the squeeze roll (for example, the rough application roll 4 and the application roll 2). Following this, the additive for changing the composition of the magnesia slurry is adhered to the steel strip 1 using the spray device 3 while varying its weight ratio to the magnesia slurry in a range of 15% or less in the longitudinal direction and/or the width direction of the steel strip 1.

Thus, the annealing separator (main component) is uniformly applied to the steel sheet using the application roll or the like and the minute additive (auxiliary component) is adhered to the steel sheet using the spray device or the like, to combine approximately uniform application of the annealing separator to the steel sheet surface and small changes in the composition of the annealing separator in the longitudinal direction and/or the width direction of the steel sheet. This can resolve deviations in annealing temperature, atmosphere gas, and the like depending on the site of the coiled steel sheet, as a result of which a grain-oriented electrical steel sheet having uniform and good coating properties and magnetic properties throughout the length and/or the width of the steel sheet can be obtained. The effect of the adhesion of the additive on the overall film thickness of the forsterite film is negligible.

[Final Annealing]

After drying and baking the annealing separator and the additive, the steel sheet in a coiled state is subjected to final annealing to develop secondary recrystallized texture and also form a forsterite film. In the final annealing, it is necessary to perform purification treatment following the completion of the secondary recrystallization. Since the elements other than Si are detrimental to the magnetic properties, these elements are preferably reduced as much as possible.

[Flattening Annealing]

Subsequently, after removing the unreacted annealing separator, it is effective to perform flattening annealing for shape adjustment. Here, by providing a tension coating on the steel sheet surface before or after the flattening annealing, the iron loss can be effectively improved with slight tension. Grain-oriented electrical steel sheets are typically used in a stacked state. In such a case, it is necessary to suppress conduction between layers. The tension coating can then also function as an insulating material for the steel sheet. Alternatively, another insulating coating may be provided on the steel sheet.

[Magnetic Domain Refining Treatment]

It is effective to perform magnetic domain refining treatment in any process not before the final cold rolling for obtaining the product sheet thickness, from the viewpoint of reducing the iron loss which is the sum of hysteresis loss and eddy current loss. By performing the magnetic domain refining treatment, the eddy current loss increased due to coarsening of secondary recrystallized grains can be reduced. This, together with reduction in hysteresis loss resulting from a high degree of accumulation into the Goss orientation and high purification, contributes to significantly low iron loss. As the method of the magnetic domain refining treatment, a known heat resistant or non-heat resistant treatment method may be used. However, with a method of applying an electron beam or a laser beam to the steel sheet surface after the secondary recrystallization, the magnetic domain refining effect can penetrate inside of the steel sheet in the sheet thickness direction, so that excellent iron loss property can be achieved as compared with other magnetic domain refining treatment methods such as etching.

The other production conditions may be in accordance with typical production methods for grain-oriented electrical steel sheets.

EXAMPLES

First Example

Steel slabs having a chemical composition containing C: 500 ppm, Si: 3.30%, Mn: 0.30%, Al: 180 ppm, S: 15 ppm, Se: 100 ppm, N: 90 ppm, P: 0.06%, Sb: 0.07%, and Mo: 0.015% with the balance consisting of Fe and inevitable impurities were each heated to 1350° C., and then hot rolled to 2.2 mm in thickness. The resultant hot-rolled sheet was then subjected to hot-rolled sheet annealing at 1050° C. for 30 sec, and cold rolled once in a tandem mill to obtain a cold-rolled sheet having a final sheet thickness of 0.23 mm. After this, the cold-rolled sheet was heated to 820° C., and subjected to decarburization annealing for 1.5 min in a wet hydrogen atmosphere.

Next, an annealing separator mainly containing magnesia was applied using the line illustrated in FIG. 2B. Specifically, in Example 1-1, the annealing separator was applied using the line illustrated in FIG. 2B in the following manner: 10 mass % magnesia slurry obtained by adding 5 parts by weight of $TiO_2$ and 3 parts by weight of magnesium sulfate with respect to 100 parts by weight of MgO was applied to both sides with an application quantity of 90 g/m² using a roll coater. Following this, using a spray nozzle provided at each of four locations for both edges of the steel strip in the upper and lower parts on the downstream side of the roll coater and a coater pan for collecting excess slurry of the slurry application roll coater and on the upstream side of a drying and baking furnace and having a jetting port 150 mm away from the steel sheet vertically, a magnesium sulfate aqueous solution was sprayed in a quantity to be adhered of 10 g/m² on both sides (both surfaces) per 100 mm in width from both edges of the steel strip while adjusting the concentration of the magnesium sulfate aqueous solution so that the total addition amount of magnesium sulfate would be 5 parts by weight. Drying and baking were then performed. In Comparative Example 1-1, the same process as in Example 1-1 was performed, with the application quantity of the magnesium sulfate aqueous solution by the spray nozzle being 20 g/m². In Comparative Example 1-2, 10 mass % magnesia slurry obtained by adding 5 parts by weight of $TiO_2$ and 3 parts by weight of magnesium sulfate with respect to 100 parts by weight of MgO was applied to both sides with an application quantity of 90 g/m² using a roll coater, and dried and baked. That is, spraying using a spray nozzle was not performed in Comparative Example 1-2.

After this, each steel strip was coiled, and subjected to final annealing of heating to 900° C. at a heating rate of 25° C./hr in a 100% $N_2$ atmosphere, then retaining or heating at a constant heating rate to 950° C., then heating to 1200° C. in a 75% $N_2$+25% $H_2$ atmosphere, and then performing purification treatment at 1200° C. for 8 hr in a 100% $H_2$ atmosphere. The steel strip was then subjected to flattening annealing at 850° C. for 20 sec, to obtain a grain-oriented electrical steel sheet.

Figure 3:
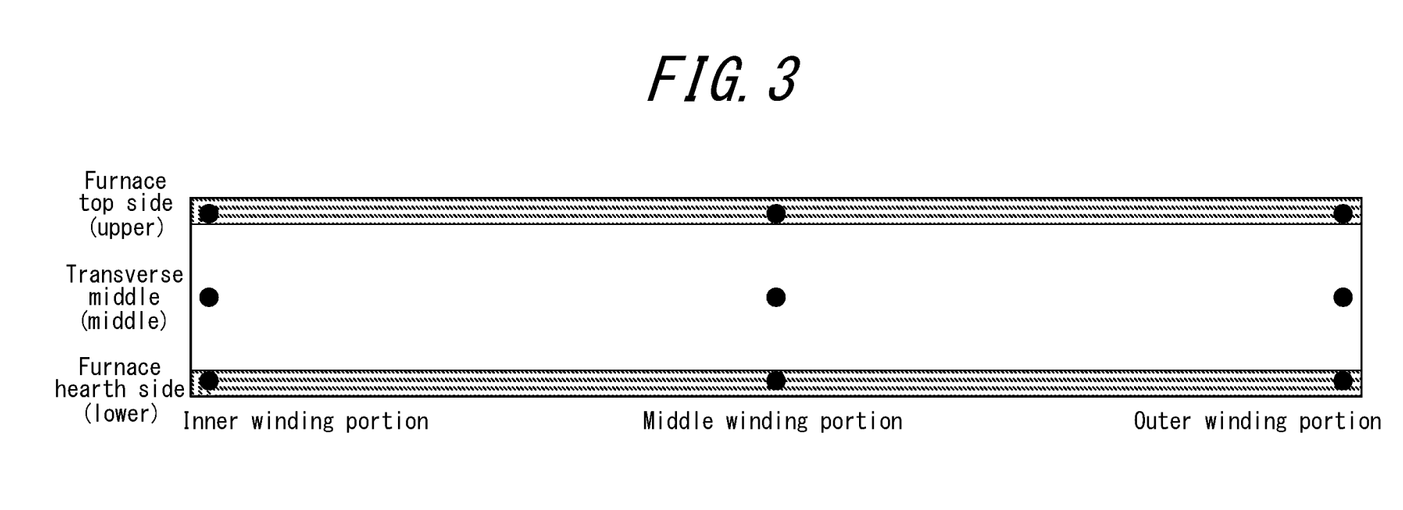
FIG. 3 is a schematic diagram explaining an adhered region of an additive in Example 1-1.
Figure 4:
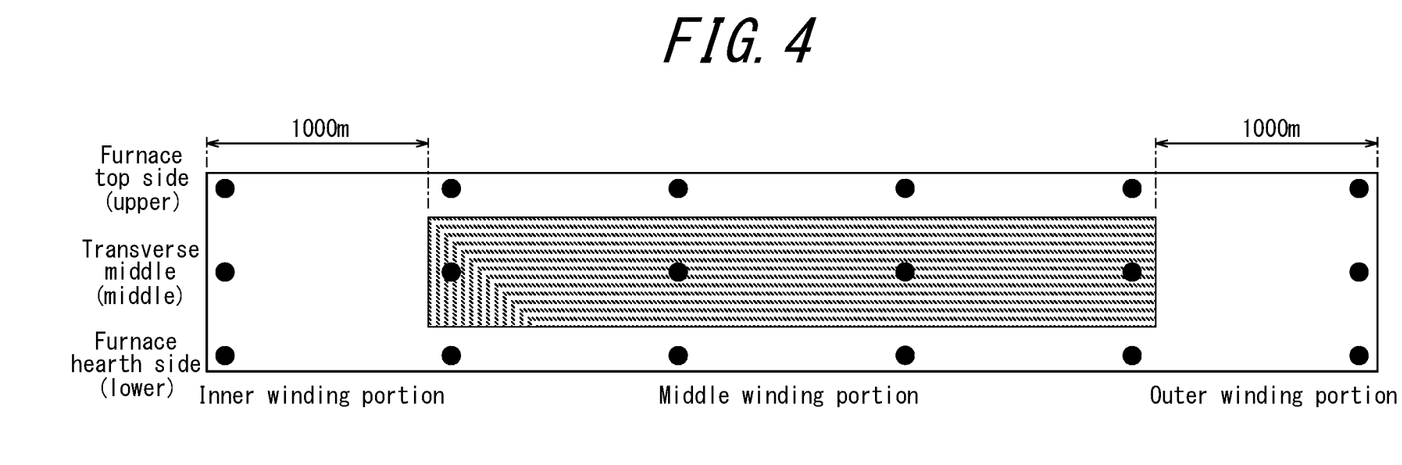
FIG. 4 is a schematic diagram explaining an adhered region of an additive in Example 2-1.

For each grain-oriented electrical steel sheet, the magnetic flux density $B_8$ and the coating appearance were evaluated in a total of nine locations, i.e. the furnace top side, the middle part, and the furnace hearth side in the width direction of each of a coil innermost winding portion, a coil middle winding portion, and a coil outermost winding portion in the final annealing, as illustrated in FIG. 3. The evaluation results are shown in Table 2.

TABLE 2

| Parts by weight of magnesium sulfate | Ratio of magnesium sulfate aqueous solution (%) | Coating appearance | | | Transverse average of magnetic flux density $B_8$ (T) | | | Remarks |
|---|---|---|---|---|---|---|---|---|
| | | Inner winding | Middle winding | Outer winding | Inner winding | Middle winding | Outer winding | |
| 2.0 | 10 | Upper: good<br>Middle: good<br>Lower: good | Upper: good<br>Middle: good<br>Lower: good | Upper: good<br>Middle: good<br>Lower: good | 1.935 | 1.930 | 1.935 | Example 1-1 |
| 2.0 | 18 | Upper: slightly inferior<br>Middle: good<br>Lower: nonuniform | Upper: slightly inferior<br>Middle: good<br>Lower: good | Upper: poor<br>Middle: good<br>Lower: nonuniform | 1.915 | 1.920 | 1.910 | Comparative Example 1-1 |
| — | 0 | Upper: slightly inferior | Upper: slightly inferior | Upper: poor<br>Middle: good | 1.900 | 1.915 | 1.890 | Comparative Example 1-2 |
| | | | | | Secondary recrystallization failure on furnace top side | | | |

TABLE 2-continued

| Parts by weight of magnesium sulfate | Ratio of magnesium sulfate aqueous solution (%) | Coating appearance | | | Transverse average of magnetic flux density $B_8$ (T) | | | Remarks |
|---|---|---|---|---|---|---|---|---|
| | | Inner winding | Middle winding | Outer winding | Inner winding | Middle winding | Outer winding | |
| | | Middle: good Lower: slightly inferior | Middle: good Lower: good | Lower: slightly inferior | | | | |

As shown in Table 2, in Comparative Example 1-2, the coating appearance was good in the middle part of the coil, but the coating appearance degraded due to insufficient film formation on the furnace top side (coil upper end) and the furnace hearth side (coil lower end) of the coil. Regarding the magnetic properties, too, a secondary recrystallization failure partially occurred mainly on the furnace top side (coil upper end). In Comparative Example 1-1, due to insufficient mixing of the annealing separator, the coating appearance was not uniform especially on the furnace hearth side (coil lower end) of the coil. The magnetic flux density also degraded to some extent. In Example 1-1, the coating appearance was uniform and good and the magnetic flux density was stable at high level throughout the length and the width of the coil.

Second Example

Steel slabs having a chemical composition containing C: 600 ppm, Si: 3.40%, Mn: 0.15%, Al: 300 ppm, S: 70 ppm, Cr: 0.12%, N: 90 ppm, P: 0.02%, and Sn: 0.05% with the balance consisting of Fe and inevitable impurities were each heated to 1150° C., and then hot rolled to 2.2 mm in thickness. The resultant hot-rolled sheet was then subjected to hot-rolled sheet annealing at 1100° C. for 30 sec, cooled to 900° C. at 10° C./sec, held at 900° C. for a short time, and then rapidly cooled. After pickling, a cold-rolled sheet having a final sheet thickness of 0.23 mm was produced in a Sendzimir mill. The cold-rolled sheet was then heated to 820° C., and subjected to decarburization annealing for 2 min in a wet hydrogen atmosphere and nitriding annealing using ammonia gas at 750° C. for 30 sec.

Next, an annealing separator mainly containing magnesia was applied. Specifically, in Example 2-1 and Comparative Example 2-1, 10 mass % magnesia slurry obtained by adding 8 parts by weight of $TiO_2$ with respect to 100 parts by weight of MgO was uniformly applied to both sides of the steel strip with an application quantity of 80 g/m² using a roll coater, and a sodium borate aqueous solution was adhered to both sides of the steel strip using a spray nozzle located immediately downstream of the roll coater in the same device as in the first example. Here, in Example 2-1, the sodium borate aqueous solution was adhered to the region except the region of 1000 m from both ends (longitudinal edges) of the steel strip in the longitudinal direction and the region of 100 mm from both edges (transverse edges) of the steel strip in the width direction. In Comparative Example 2-1, on the other hand, the sodium borate aqueous solution was adhered to the whole surface of the steel strip. The ratio of the adhered sodium borate aqueous solution was 2%, equivalent to 0.5 parts by weight. In Comparative Example 2-2, 10 mass % of magnesia slurry obtained by adding 8 parts by weight of $TiO_2$ with respect to 100 parts by weight of MgO was uniformly applied to both sides of the steel strip with an application quantity of 80 g/m² using the roll coater, without adhesion of a sodium borate aqueous solution using the spray nozzle.

After this, each steel strip was coiled, and subjected to final annealing at 1200° C. for 20 hr. The heating rate to 900° C. was 15° C./h, and the heating rate from 900° C. to 1200° C. was 10° C./h. The atmosphere gas was a mixed gas of $H_2$: 75% and $N_2$: 25%. The steel strip was then subjected to flattening annealing at 850° C. for 20 sec, to obtain a grain-oriented electrical steel sheet.

For each grain-oriented electrical steel sheet, the magnetic flux density $B_8$ and the coating appearance were evaluated throughout the coil. The evaluation results are shown in Table 3.

TABLE 3

| Parts by weight of sodium borate | Ratio of sodium borate aqueous solution (%) | Adhered region of sodium borate aqueous solution | Coating appearance | Transverse average of magnetic flux density $B_8$ (T) | Remarks |
|---|---|---|---|---|---|
| 0.5 | 2 | Except 1000 m from both coil longitudinal edges Except 100 mm from transverse edges | Uniform and aesthetic throughout length and width | Transverse average throughout length: 1.930 to 1.935 | Example 2-1 |
| 0.5 | 2 | Whole surface | Poor appearance in transverse edges up to the around 1000 m from both coil longitudinal edges | Both coil longitudinal edges: 1.910 Middle part: 1.920 to 1.930 | Comparative Example 2-1 |
| — | 0 | — | Slightly thin-film in transverse middle in region of about 3000 m in coil length | Both coil longitudinal edges: 1.920 Middle part: 1.905 to 1.915 | Comparative Example 2-2 |

As shown in Table 3, in Comparative Example 2-2, in the transverse middle part in the region of 3000 m in length except the region of about 1000 m from both longitudinal edges of the coil, the film formation was insufficient, the film was slightly thin, and the coating properties were poor. Regarding the magnetic properties, the magnetic flux density decreased in the position approximately corresponding to the region where the film was slightly thin. In Comparative Example 2-1, the coating properties were good in the longitudinal middle part of the coil. In the transverse edge part in the region of about 1000 m from both longitudinal edges of the coil, however, the coating appearance degraded, and the magnetic flux density in both longitudinal edge parts of the coil was slightly lower than the magnetic flux density in the longitudinal middle part of the coil. In Example 2-1, on the other hand, the coating appearance was uniform and good and the magnetic flux density was stable at high level throughout the length and the width of the coil.

INDUSTRIAL APPLICABILITY

It is thus possible to obtain a grain-oriented electrical steel sheet having uniform and good coating properties and magnetic properties throughout the length and/or the width of the steel sheet.

REFERENCE SIGNS LIST 1 steel strip
2 application roll
3 spray device
4 rough application roll
5 slurry supply nozzle

The invention claimed is:
1. A method of producing a grain-oriented electrical steel sheet, the method comprising:
   subjecting a steel slab having a predetermined chemical composition to hot rolling, to obtain a hot-rolled steel sheet;
   subjecting the hot-rolled steel sheet to cold rolling once or twice or more with intermediate annealing therebetween, to obtain a cold-rolled steel sheet;
   subjecting the cold-rolled steel sheet to primary recrystallization annealing;
   applying a liquid or slurry annealing separator by a main line being a roll coater application device to the cold-rolled steel sheet after the primary recrystallization annealing; and
   thereafter coiling the steel sheet and subjecting the steel sheet to final annealing,
   wherein, before, after, or simultaneously with the application of the annealing separator, an additive aqueous solution for changing a composition of the annealing separator is adhered by an auxiliary line being a spray device to the cold-rolled steel sheet subjected to the primary recrystallization annealing at a weight ratio of 15% or less to a total of the liquid or slurry annealing separator and the additive aqueous solution so as to vary the composition of the annealing separator in at least one selected from a longitudinal direction and a width direction of the cold-rolled steel sheet.

* * * * *